(12) United States Patent
Kim et al.

(10) Patent No.: US 11,810,586 B2
(45) Date of Patent: Nov. 7, 2023

(54) METHODS AND APPARATUSES FOR NOISE REDUCTION BASED ON TIME AND FREQUENCY ANALYSIS USING DEEP LEARNING

(71) Applicant: LINE Plus Corporation, Seongnam-si (KR)

(72) Inventors: Ki Jun Kim, Seongnam-si (KR); JongHewk Park, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/394,669

(22) Filed: Aug. 5, 2021

(65) Prior Publication Data

US 2022/0044696 A1    Feb. 10, 2022

(30) Foreign Application Priority Data

Aug. 6, 2020    (KR) ........................ 10-2020-0098569

(51) Int. Cl.

| | |
|---|---|
| *G10L 21/0224* | (2013.01) |
| *G10L 21/0232* | (2013.01) |
| *G06N 3/08* | (2023.01) |
| *G10L 25/30* | (2013.01) |
| *G06N 3/04* | (2023.01) |
| *G06N 3/045* | (2023.01) |

(52) U.S. Cl.
CPC .......... *G10L 21/0224* (2013.01); *G06N 3/045* (2023.01); *G06N 3/08* (2013.01); *G10L 21/0232* (2013.01); *G10L 25/30* (2013.01)

(58) Field of Classification Search
CPC . G10L 21/0224; G10L 21/0232; G10L 25/30; G06N 3/0454; G06N 3/08
See application file for complete search history.

(56) References Cited

U.S. PATENT DOCUMENTS

| | | | |
|---|---|---|---|
| 10,511,908 B1* | 12/2019 | Fisher | .................... H04B 15/00 |
| 2017/0169812 A1* | 6/2017 | Lample | .................... G10L 15/01 |
| 2017/0365266 A1* | 12/2017 | Helmrich | ................ G10L 19/02 |
| 2019/0285673 A1* | 9/2019 | Skovenborg | ......... G01R 23/167 |
| 2020/0184987 A1* | 6/2020 | Kupryjanow | ....... G10L 21/0224 |

(Continued)

FOREIGN PATENT DOCUMENTS

KR    2018-0067608 A    6/2018

*Primary Examiner* — Leonard Saint-Cyr
*Assistant Examiner* — Ethan Daniel Kim
(74) *Attorney, Agent, or Firm* — Harness, Dickey & Pierce, P.L.C.

(57) ABSTRACT

A noise cancellation method including generating a first voice signal by canceling a first portion of noise included in an input voice signal using a first network, the first network being a trained u-net structure, and the first portion of the noise being in a time domain, applying a first window to the first voice signal, performing a fast Fourier transform on the first windowed voice signal to acquire a magnitude signal and a phase signal, acquiring a mask using a second network based on the magnitude signal, the second network being another trained u-net structure, applying the mask to the magnitude signal, generating a second voice signal by canceling a second portion of the noise by performing an inverse fast Fourier transform on the first windowed voice signal based on the masked magnitude signal and the phase signal, and applying a second window to the second voice signal.

20 Claims, 9 Drawing Sheets

(56) References Cited

U.S. PATENT DOCUMENTS

2020/0343985 A1*  10/2020  O'Shea .............. H04B 17/391
2021/0104256 A1*   4/2021  Jansson ............. G10L 25/51
2022/0227672 A1*   1/2022  Xu .................. G06K 9/62

* cited by examiner

FIG. 7
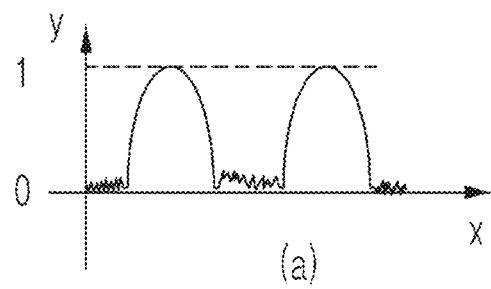
(a)
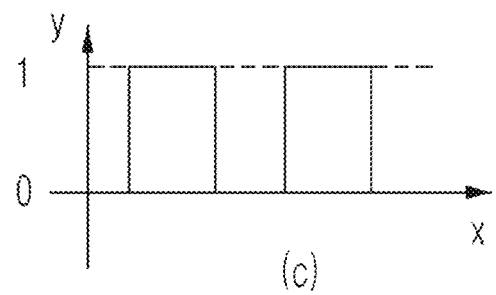
(c)
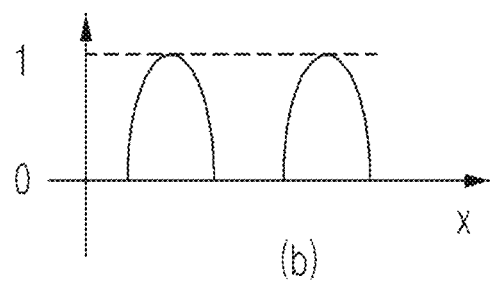
(b)
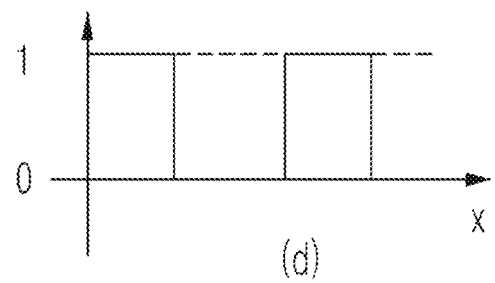
(d)

METHODS AND APPARATUSES FOR NOISE REDUCTION BASED ON TIME AND FREQUENCY ANALYSIS USING DEEP LEARNING

CROSS-REFERENCE TO RELATED APPLICATION(S)

This U.S. non-provisional application claims the benefit of priority under 35 U.S.C. § 119 to Korean Patent Application No. 10-2020-0098569, filed Aug. 6, 2020, the entire contents of which are incorporated herein by reference in their entirety.

TECHNICAL FIELD

Some example embodiments relate to a method and apparatus for cancelling noise in an input voice signal including noise, and more particularly, to a method and apparatus for cancelling noise by simultaneously or contemporaneously using information of a time domain and information of a frequency domain.

BACKGROUND

Currently, with the increasing interest in Internet calls, such as voice over Internet protocol (VoIP), and development and provision of content utilizing other voice/sound signals, interest in technology for cancelling noise in a voice signal is also increasing.

Research on the existing noise cancellation technology using deep learning has been conducted as a method of cancelling a noise component in a frequency domain or a method of inferring clean voice in a time domain. However, existing methods have limitations in their performance.

Initially, the method of cancelling noise in a frequency domain includes a method of adjusting only a magnitude of a frequency, and a method of adjusting a magnitude and a phase of a frequency. The method of adjusting only a magnitude of a frequency may exhibit excellent performance in an environment with low noise. However, in an environment with severe noise, phase information of noise is superior to phase information of voice and a noise component of a phase still remains. Accordingly, clean sound is not recovered even after cancelling a noise component of a magnitude.

To outperform this, methods of simultaneously or contemporaneously adjusting a magnitude and a phase have been attempted. However, due to the random nature of the noise component of a phase, phase learning has not been appropriately performed and the entire performance is not excellent accordingly.

To outperform disadvantages found in a frequency domain as discussed above, a method of inferring a clean voice in a time domain is developed. This method may generate a raw signal of clean voice and thus, a phase and a magnitude of a frequency component are simultaneously or contemporaneously adjusted. However, in a time domain, a high frequency component has a random characteristic. Therefore, a high frequency band signal is not well learned and white noise still remains even after noise cancellation.

The aforementioned information is simply provided to assist understanding and may include content that does not form a portion of the related art and may not include content that the related art may provide to those skilled in the art.

SUMMARY

Some example embodiments provide a noise cancellation method and apparatus that may exhibit excellent performance in an environment with severe noise by including a network, in each of a frequency domain and a time domain, to simultaneously (or contemporaneously) use and adjust information of the frequency domain and information of the time information, and by performing learning such that two networks may achieve excellent performance in a complementary manner, in order to solve issues found in a method of cancelling noise in the frequency domain and a method of inferring clean voice in the time domain.

According to an aspect of some example embodiments, there is provided a noise cancellation method using a computer system, the noise cancellation method including generating a first voice signal by canceling a first portion of noise included in an input voice signal using a first network, the first network being a trained u-net structure, and the first portion of the noise being in a time domain, applying a first window to the first voice signal to obtain a first windowed voice signal, performing a fast Fourier transform (FFT) on the first windowed voice signal to acquire a magnitude signal and a phase signal, acquiring a mask using a second network based on the magnitude signal, the second network being another trained u-net structure, applying the mask to the magnitude signal to obtain a masked magnitude signal, generating a second voice signal by canceling a second portion of the noise by performing an inverse fast Fourier transform (IFFT) on the first windowed voice signal based on the masked magnitude signal and the phase signal, and applying a second window to the second voice signal to obtain a second windowed voice signal.

At least one of the first window and/or the second window may include a Kaiser-Bessel-derived window for time domain aliasing cancellation (TDAC) in modified discrete cosine transform (MDCT).

The magnitude signal may include a first magnitude signal and a second magnitude signal. The acquiring of the mask to be applied to the magnitude signal may include acquiring a first mask using the second network based on the first magnitude signal, the first magnitude signal being in a first frequency band, dividing the second magnitude signal into a plurality of second magnitude sub-signals according to bandwidth, the second magnitude signal being in a second frequency band greater than the first frequency band, calculating an average energy for each of the plurality of second magnitude sub-signals, and acquiring a second mask using the second network based on the average energy for each of the plurality of second magnitude sub-signals.

The second magnitude signal may be divided into the plurality of second magnitude sub-signals by dividing the second frequency band based on a bark scale unit.

The first mask may be an ideal ratio mask (IRM) for the first magnitude signal and the second mask may be an IRM for the average energy, and, the applying the mask to the magnitude signal may include multiplying the first mask by the first magnitude signal and multiplying the second mask by the second magnitude signal.

The acquiring of the first mask may include calculating a number of Mel-frequency cepstral coefficients (MFCCs) based on the first magnitude signal, and acquiring the first mask using the second network based on the MFCCs.

The acquiring of the first mask may include calculating a zero-crossing rate (ZCR) based on the first magnitude signal, and acquiring the first mask using the second network based on the ZCR.

The generating of the second voice signal may include estimating a denoised magnitude signal by multiplying the magnitude signal and the mask, recovering an FFT coefficient based on the denoised magnitude signal and the phase signal, and recovering the second voice signal by performing the IFFT based on the FFT coefficient.

The input voice signal may include a plurality of frames.

According to an aspect of some example embodiments, there is provided a non-transitory computer-readable storage medium storing instructions that, when executed by at least one processor, cause the at least one processor to perform the noise cancellation method.

The noise cancellation method may include generating an audio signal based on the second windowed voice signal, and driving a speaker to output the audio signal.

The second portion of the noise may be in a frequency domain.

According to an aspect of some example embodiments, there is provided a computer system for cancelling noise, the computer system including a memory storing computer-readable instructions, and at least one processor configured to execute the computer-readable instructions to cause the computer systems to generate a first voice signal by canceling a first portion of noise included in an input voice signal using a first network, the first network being a trained u-net structure, and the first portion of the noise being in a time domain, apply a first window to the first voice signal to obtain a first windowed voice signal, perform a fast Fourier transform (FFT) on the first windowed voice signal to acquire a magnitude signal and a phase signal, acquire a mask using a second network based on the magnitude signal, the second network being another trained u-net structure, apply the mask to the magnitude signal to obtain a masked magnitude signal, generate a second voice signal by canceling a second portion of the noise by performing an inverse fast Fourier transform (IFFT) on the first windowed voice signal based on the masked magnitude signal and the phase signal, and apply a second window to the second voice signal to obtain a second windowed voice signal.

According to some example embodiments, it is possible to exhibit excellent performance in an environment with severe noise by including a network in each of a frequency domain and a time domain to simultaneously (or contemporaneously) use and adjust information of the frequency domain and information of the time information and by performing learning such that two networks may achieve excellent performance in a complementary manner, in order to solve issues found in a method of cancelling noise in the frequency domain and a method of inferring clean voice in the time domain.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIG. 7 is an example of a mask estimated by a machine learning model according to some example embodiments;

DETAILED DESCRIPTION

Figure 1:
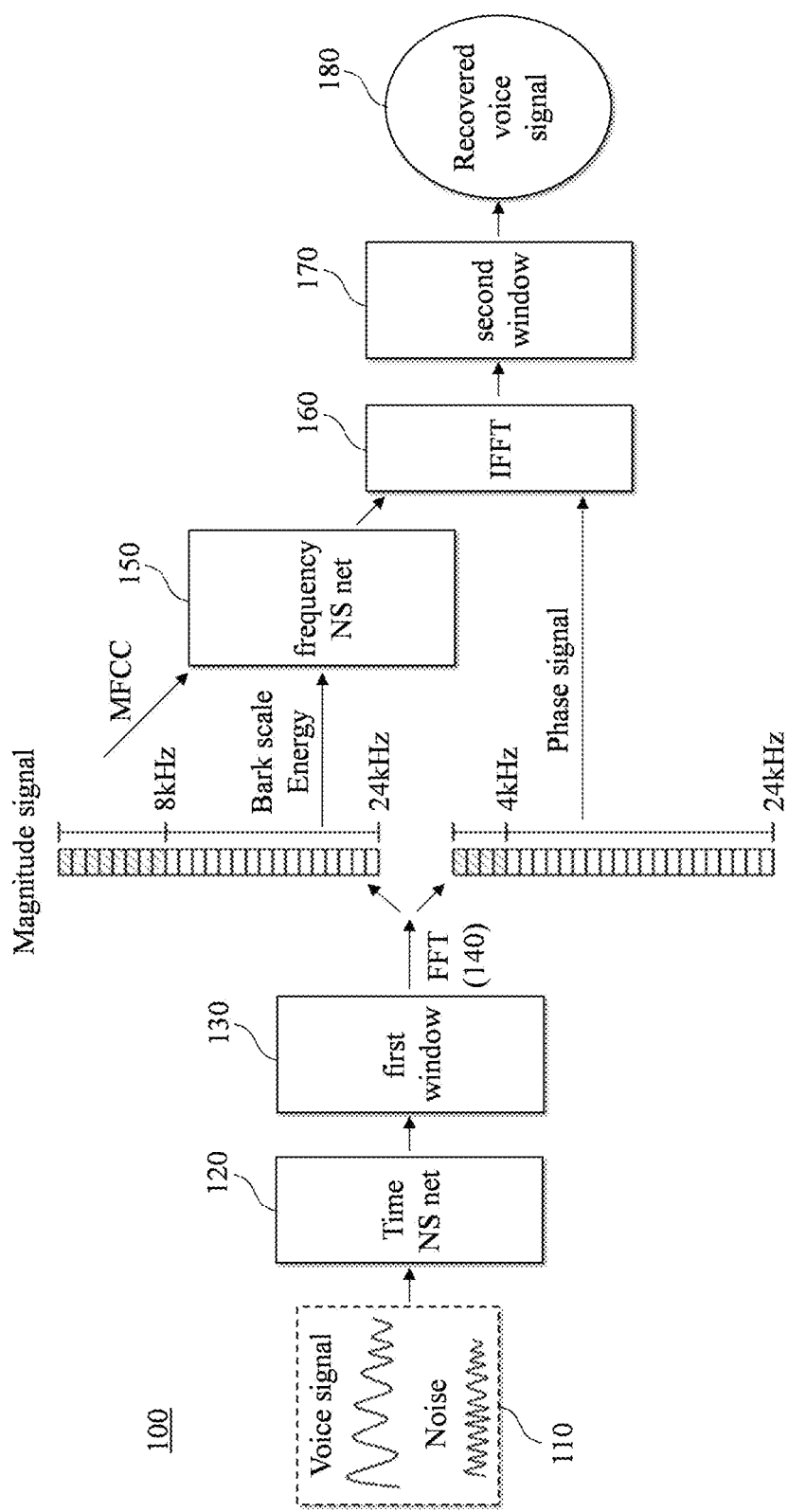
FIG. 1 illustrates an example of a method of recovering a voice signal in which noise is cancelled by processing a voice signal including noise according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings. Like reference numerals provided in the respective drawings refer to like elements.

FIG. 1 illustrates an example of a method of recovering a voice signal in which noise is cancelled by processing a voice signal including noise according to some example embodiments.

A method of acquiring a recovered voice signal 180 by cancelling noise in an input voice signal 110 that includes noise and a voice signal is described with reference to FIG. 1.

To apply technology in real time in a mobile environment, a frame-by-frame operation may be performed on the input voice signal 110. The input voice signal 110 may be, for example, a signal having a sampling rate of 16 kilohertz (kHz) and a length of a single frame may be 480 samples. A hop size may be 240 samples and may operate as a 50% overlap add.

A method of cancelling noise in the input voice signal 110 according to some example embodiments may be performed by the following computer system 100.

To recover a phase of the voice signal and primarily (e.g., initially) cancel noise in an environment with severe noise, a raw waveform of the input voice signal 110 may be used as an input of a time NS net 120. The time NS net 120 may be a network designed in a u-net structure. The time NS net 120 may be implemented through an artificial neural network, for example, a convolutional neural network (CNN), a deep neural network (DNN), and/or a dense network. For example, a size of each of a total of 12 layers may be configured to be a half of a length of a previous layer, such as 512-256-128 64 32 16 16 32 64 128-256-512. Although the time NS net 120 may be configured as a u-net, details may vary depending on tuning. An output of the time NS net 120 is a raw first voice signal that is primarily estimated and a weak white noise component may be mixed in the first voice signal.

Before performing a fast Fourier transform (FFT) 140 on the first voice signal, a window for improving an output characteristic of the FFT 140 may be applied. Also, a window may be applied to cancel noise occurring due to discontinuity in an overlap add section between a previous frame and a current frame. In FIG. 1, a first window 130 is applied before performing the FFT 140 and a second window 170 is applied after performing an inverse fast Fourier transform (IFFT) 160. Various types of windows may be applicable. For example, a Kaiser-Bessel-derived (KBD) window used for time domain aliasing cancellation (TDAC) in modified discrete cosine transform (MDCT) may be used. Although it is different, a sum of squares of the window in an overlap section meets 1 in the KBD window and a simultaneous (or contemporaneous) KBD window application may be performed before the FFT 140 and after the IFFT 160. That is, the first window 130 and the second window 170 may be simultaneously or contemporaneously performed. If the windows are applied in two sections as described above, noise caused by discontinuity between frames may be further effectively canceled. In the case of applying the KBD window in actually implemented technology, high performance may be achieved.

The FFT 140 may be performed on the first voice signal to which the first window 130 is applied. A magnitude signal representing magnitude of the input voice signal 110 and a phase signal representing a phase of the input voice signal 110 may be acquired from the input voice signal 110 on which the FFT 140 is performed.

Referring to FIG. 1, in some example embodiments, a magnitude signal belonging to a lower band, for example, a bandwidth of less than 8 kHz may be recovered using a frequency NS net 150. Meanwhile, a magnitude signal belonging to a higher band, for example, a bandwidth of 8 kHz or more, may be divided based on a bark scale unit and the average energy of the divided magnitude signal may be input to the frequency NS net 150 and recovered. Also, the phase signal may be used to perform the IFFT 160 without particular processing. Also, the magnitude signal belonging to the lower band and Mel frequency cepstral coefficient (MFCC)(s) generated based on the magnitude signal belonging to the corresponding lower band may be input as a parameter to the frequency NS net 150.

The frequency NS net 150 may be implemented in a u-net structure through, for example, an artificial neural network, such as, for example, a CNN, a DNN, and/or a dense network.

An output from the frequency NS net 150 may be a mask to be applied to a magnitude as an FFT coefficient output from the FFT 140. Noise may be secondarily cancelled using the magnitude to which the mask is applied and the phase signal as an FFT coefficient output from the FFT 140. For example, the FFT coefficient of the first voice signal may be recovered using the magnitude to which the mask is applied and the phase signal, and noise may be secondarily cancelled by performing the IFFT 160 and the recovered voice signal 180 may be output accordingly.

Here, as described above, noise by frame discontinuity may be minimized or reduced by applying the second window 170 to an output of the IFFT 160.

According to some example embodiments, compared to a case in which the magnitude signal belonging to the higher band is input to the frequency NS net 150 as is, a computational amount for cancelling noise may significantly decrease.

As described above, according to some example embodiments, it is possible to provide an excellent noise cancellation performance in an environment with severe noise by configuring a network for each of a frequency domain and a time domain and performing learning such that the two networks may achieve excellent performance in a complementary manner.

Hereinafter, a method of generating the recovered voice signal 180 in which noise is cancelled by processing the input voice signal 110 that includes noise is further described with reference to FIGS. 2 to 9.

Figure 2:
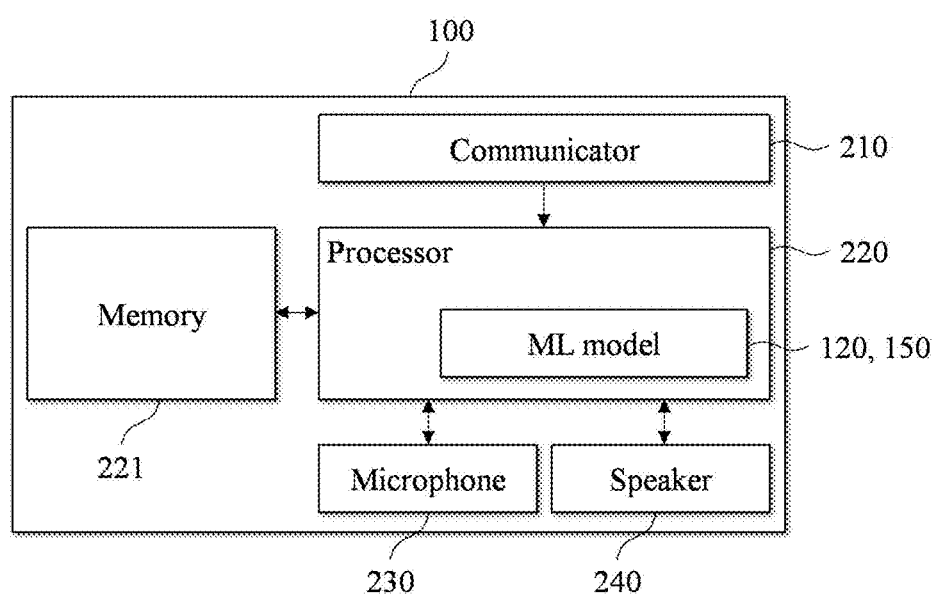
FIG. 2 is a diagram illustrating an example of a structure of a computer system to cancel noise by processing a voice signal including noise according to some example embodiments.

FIG. 2 is a diagram illustrating an example of a structure of a computer system for cancelling noise by processing a voice signal including noise according to some example embodiments.

The computer system 100 of FIG. 2 may correspond to the computer system 100 of FIG. 1. The computer system 100 may be an electronic device in which a light inference model, for example, a machine learning model, such as the time NS net 120 and the frequency NS net 150, is configured to cancel noise in the input voice signal 110. Alternatively, although not illustrated, the computer system 100 may be an apparatus configured to acquire the recovered voice signal 180 in which noise is cancelled from the input voice signal 110 using the machine learning (ML) model, for example, the time NS net 120 and the frequency NS net 150, present in an electronic device or server external to the computer system 100. Here, the computer system 100 may acquire the input voice signal 110 through communication with the external electronic device or server.

The computer system 100 may include, for example, a personal computer (PC), a laptop computer, a smartphone, a tablet, a wearable computer, an Internet of things (IoT) device, and/or the like. For example, the computer system 100 may be a device such as a mobile terminal and may not be a computing apparatus such as a high-performance PC or server.

The computer system 100 may include a communicator 210 and/or a processor 220. The computer system 100 may include a microphone 230 configured to receive the input voice signal 110 from a user and/or a speaker 240 configured to output the recovered voice signal 180 in which noise is cancelled. The microphone 230 may generate a voice signal from voice input from the user or an outside (e.g., a source outside of the computer system 100) and the speaker 240 may output the voice signal.

Also, although not illustrated, the computer system 100 may further include a display configured to display information/content provided based on information input from the user and/or in response to a request from the user.

The communicator 210 may be an apparatus used for the computer system 100 to communicate with another server or another apparatus. That is, the communicator 210 may be a hardware module, for example, a network interface card, a network interface chip, and/or a networking interface port of the computer system 100, and/or a software module, for example, a network device driver and/or a networking program, configured to transmit/receive data and/or information to/from the other server or the other apparatus.

The processor 220 may manage components of the computer system 100 and may execute a program or an application used by the computer system 100. For example, the processor 220 may acquire a voice signal that is input through the microphone 230 or input in advance, may process the input voice signal 110 using the machine learning model, for example, the time NS net 120 and the frequency NS net 150, and may generate the recovered voice signal 180 in which noise is cancelled from the input voice signal 110. The processor 220 may process an operation used for execution of a program or an application used to perform the above operation and for processing of data. The processor 220 may be at least one processor of the computer system 100 or at least one core within the processor.

Although not illustrated, the computer system 100 may include a memory 221. The memory 221 may include a permanent mass storage device, such as random access memory (RAM), read only memory (ROM), and/or a disk drive, as a non-transitory computer-readable storage medium. Here, the ROM and/or the permanent mass storage device may be separated from the memory 221 and may be included as a separate permanent storage device. Also, an operating system (OS) and at least one program code may be stored in the memory 221. Such software components may be loaded from a computer-readable storage medium separate from the memory 221. The separate computer-readable storage medium may include a non-transitory computer-readable storage medium, such as a floppy drive, a disk, a tape, a DVD/CD-ROM drive, and/or a memory card. According to some example embodiments, software components may be loaded to the memory 221 through the communicator 210 instead of, or in addition to, the non-transitory computer-readable storage medium. Here, the machine learning model, for example, the time NS net 120 and the frequency NS net 150, may be a software module configured to operate through the processor 220 according to a program code loaded to the memory 221.

The processor 220 may be configured to process computer-readable instructions of a computer program by performing basic arithmetic operations, logic operations, and I/O operations. The computer-readable instructions may be provided from the memory 221 or the communicator 210 to the processor 220. For example, the processor 220 may be configured to execute received instructions in response to the program code loaded to the memory 221. Through an operation of the processor 220, the computer system 100 may generate the recovered voice signal 180 in which noise is cancelled from the input voice signal 110.

For example, the processor 220 may generate a first voice signal in which a phase is recovered and noise is primarily cancelled by inputting an input voice signal including noise to a first network in a u-net structure (e.g., the time NS net 120) trained to infer clean voice in a time domain, may apply a first window to the first voice signal, and may acquire a magnitude signal and a phase signal by performing an FFT on the first voice signal to which the first window is applied. Also, the processor 220 may input the magnitude signal to a second network in a u-net structure (e.g., the frequency NS net 150) trained to estimate a mask to be applied to the magnitude signal and acquire the mask to be applied to the magnitude signal as an output of the second network, may apply the acquired mask to the magnitude signal, and may generate a second voice signal in which noise is secondarily cancelled by performing an IFFT on the first voice signal to which the first window is applied using the magnitude signal to which the mask is applied and the phase signal, and may generate a recovered input signal in which noise is cancelled by applying a second window to the second voice signal.

The time NS net 120 may be a machine learning model pretrained (or trained) to recover a phase and primarily cancel noise in order to infer clean voice in the time domain for the input voice signal 110, and the frequency NS net 150 may be a model pretrained (or trained) to estimate a mask to be applied to the input voice signal 110 in order to cancel noise included in the input voice signal 110. The time NS net 120 and/or the frequency NS net 150 may be trained using a plurality of training input voice signals of which correct answers are known. Each of the time NS net 120 and the frequency NS net 150 may be implemented in a u-net structure based on an artificial neural network, for example, a CNN, a DNN, and/or a dense network. The machine learning model may include a plurality of layers in a u-net structure that constitutes an artificial neural network.

Hereinafter, a method of processing the input voice signal 110 including noise, and generating the recovered voice signal 180 in which noise is cancelled, using the computer system 100 is further described.

In the following, an operation performed by components of the computer system 100 or the processor 220, or an operation performed by an application or a program executed by the computer system 100 or the processor 220, may be described as an operation performed by the computer system 100 for clarity of description.

Figure 3:
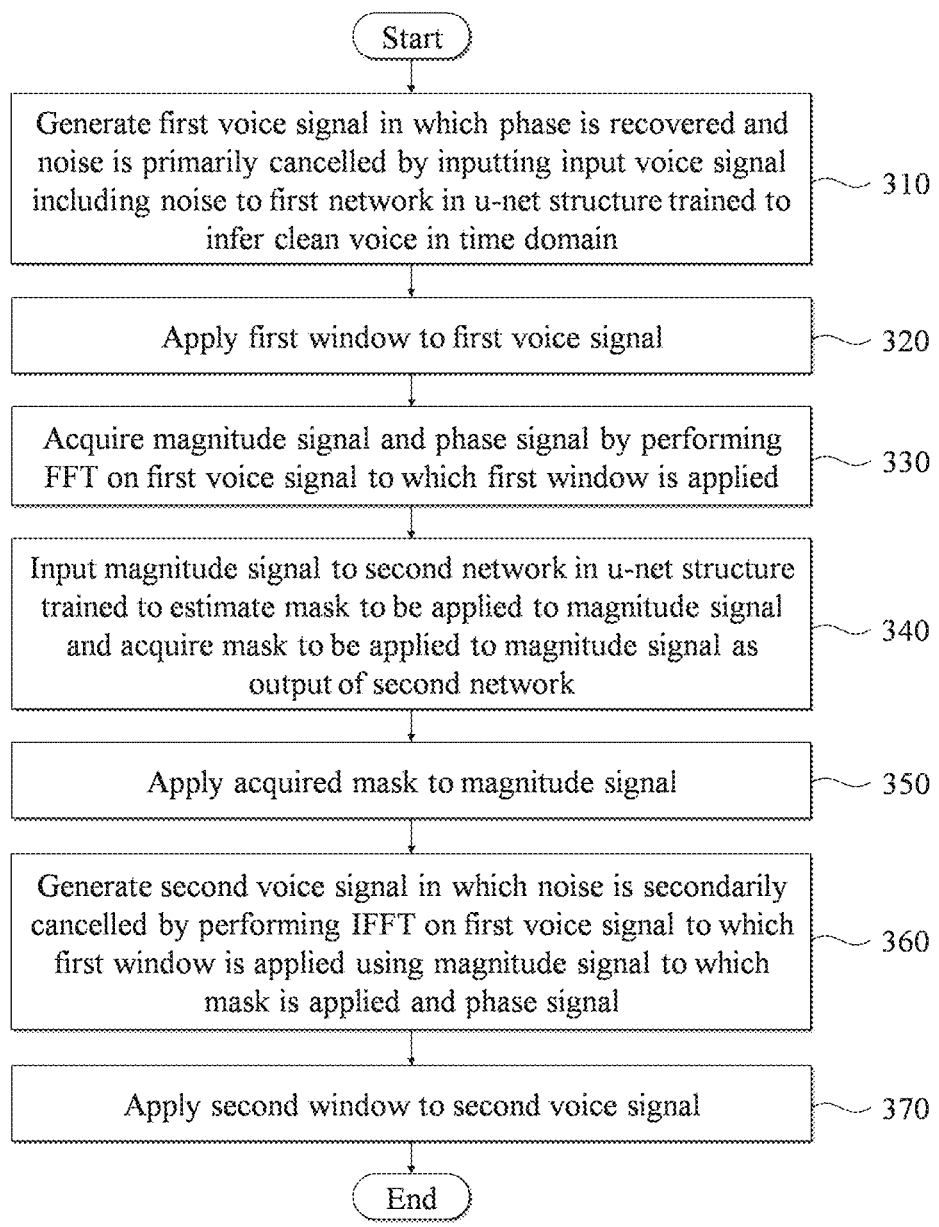
FIG. 3 is a flowchart illustrating an example of a noise cancellation method according to some example embodiments.

FIG. 3 is a flowchart illustrating an example of a noise cancellation method according to some example embodiments.

Referring to FIG. 3, in operation 310, the computer system 100 may generate a first voice signal in which a phase is recovered and noise (e.g., noise in a time domain) is primarily cancelled by inputting an input voice signal including noise to a first network in a u-net structure trained to infer clean voice, for example, voice in which noise is cancelled, in a time domain. Here, the input voice signal may correspond to the input voice signal 110 of FIG. 1, and/or may be a voice signal input to the computer system 100 through the microphone 230 of FIG. 2, may be a voice signal prestored (or stored) in the computer system 100 or a voice signal received by the computer system 100 from an external source through a network. Noise included in the input voice signal may refer to noise included in a magnitude signal and/or a phase signal, and may refer to noise other than a voice signal the user desires to hear.

As described above, the first network may correspond to a machine learning model such as the time NS net 120 and may be pretrained (or trained) to recover a phase of the input voice signal and to primarily cancel noise using the u-net structure. The first voice signal output in operation 310 may include a weak white noise component.

In operation 320, the computer system 100 may apply a first window to the first voice signal. As described above, the first window may include a KBD window used for TDAC in MDCT. However, it is provided as an example only.

In operation 330, the computer system 100 may acquire a magnitude signal and a phase signal by performing an FFT on the first voice signal to which the first window is applied (e.g., a first windowed voice signal). For example, the computer system 100 may perform 512 FFT on the first voice signal to which the first window is applied.

In operation 340, the computer system 100 may input the magnitude signal to a second network in a u-net structure trained to estimate a mask to be applied to the magnitude signal and may acquire the mask to be applied to the magnitude signal as an output of the second network. For example, the computer system 100 may extract a magnitude component from an output of the 512 FFT and may use magnitude data of 256 as an input to the second network. Here, the second network may correspond to the machine learning model such as the frequency NS net 150 and may be trained to estimate a mask to be applied to the magnitude signal that is input. A method of acquiring a mask to be applied to a magnitude signal is further described with reference to FIGS. 4 and 5.

A magnitude signal of an input voice signal and/or a parameter acquired from the corresponding magnitude signal may be an input parameter for performing inference in the second network.

In operation 350, the computer system 100 may apply the acquired mask to the magnitude signal. For example, the computer system 100 may acquire a magnitude signal in which noise of a frequency domain is cancelled by applying (e.g., multiplying) a mask output by the second network to a magnitude signal of the first voice signal to which the first window is applied.

In operation 360, the computer system 100 may generate a second voice signal in which noise (e.g., noise in a frequency domain) is secondarily cancelled by performing an IFFT on the first voice signal to which the first window is applied using the magnitude signal to which the mask is applied (e.g., the masked magnitude signal) and the phase signal. A method of acquiring the second voice signal is further described with reference to FIG. 6.

In operation 370, the computer system 100 may apply a second window to the second voice signal. As described above, the first window may include a KBD window used for TDAC in MDCT. However, it is provided as an example only. To apply technology to the input voice signal in real time in a mobile environment, the first window and the second window may be used to minimize or reduce noise occurring due to discontinuity between frames by performing a frame-by-frame operation. According to some example embodiments, the computer system 100 may generate an audio signal (e.g., an analog audio signal) based on the second voice signal after applying the second window to the second voice signal. The computer system 100 may drive a speaker (e.g., the speaker 240) to output the audio signal.

Figure 4:
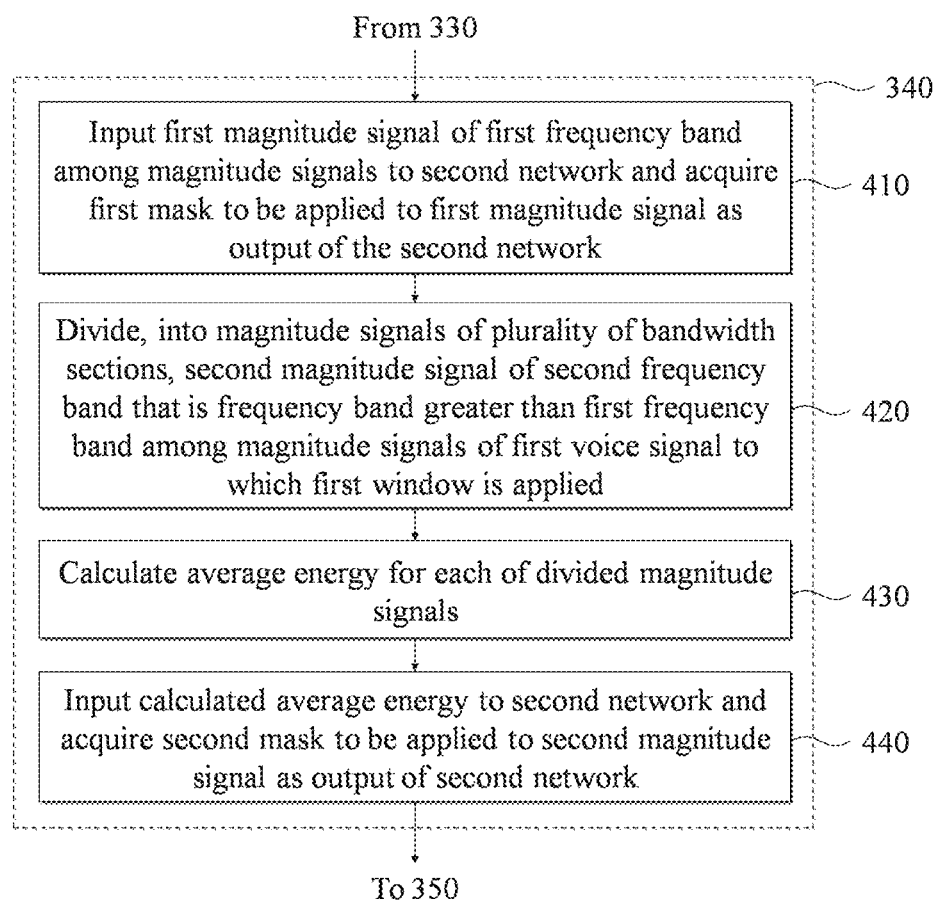
FIG. 4 is a flowchart illustrating an example of a method of acquiring a mask to be applied to a magnitude signal using a machine learning model according to some example embodiments.

FIG. 4 is a flowchart illustrating an example of a method of acquiring a mask to be applied to a magnitude signal using a machine learning model according to some example embodiments.

The method of acquiring a mask to be applied to a magnitude signal is described with reference to operations 410 to 440 of FIG. 4.

Referring to FIG. 4, in operation 410, the computer system 100 may input, to the second network, a first magnitude signal (e.g., a first portion of the magnitude signal) of a first frequency band among magnitude signals of the first voice signal to which the first window is applied and may acquire a first mask to be applied to the first magnitude signal as the output of the second network. The first magnitude signal of the first frequency band may represent a magnitude signal corresponding to a lower band among the magnitude signals of the first voice signal to which the first window is applied. For example, a first frequency band may represent a band of 0 or more and less than 8 kHz and the first magnitude signal may represent a magnitude signal belonging to the band of 0 or more and less than 8 kHz.

The first magnitude signal and/or a parameter acquired from the corresponding first magnitude signal may be an input parameter for performing inference in the second network. A magnitude signal in which noise is cancelled, that is, the first magnitude signal in which noise is cancelled may be acquired by applying the first mask to be output by the second network to the first magnitude signal, for example, by multiplying the first mask by the first magnitude signal.

Here, the first mask may be an ideal ratio mask (IRM) for the first magnitude signal. As described above, the first mask may be applied to the first magnitude signal through multiplication with the first magnitude signal.

In operation 420, the computer system 100 may divide, into magnitude signals of a plurality of bandwidth sections, a second magnitude signal (e.g., a second portion of the magnitude signal) of a second frequency band that is a frequency band greater than the first frequency band among the magnitude signals of the first voice signal to which the first window is applied. The second magnitude signal of the second frequency band may represent a magnitude signal corresponding to a higher band among the magnitude signals of the first voice signal to which the first window is applied. For example, the second frequency band may represent a band of 8 kHz or more and less than 16 kHz and the second magnitude signal may represent a magnitude signal belonging to the band of 8 kHz or more and less than 16 kHz. According to some example embodiments, the computer system may divide the second magnitude signal into a plurality of second magnitude sub-signals according to bandwidth.

For example, the computer system 100 may divide the second magnitude signal into magnitude signals of the plurality of bandwidth sections by dividing the second frequency band of the second magnitude signal based on a bark scale unit.

The bark scale may be a scale based on psychoacoustics and may be a scale to distinguish different sounds to specifically represent a characteristic of a corresponding sound in relation to characteristics of sounds, such as a magnitude, pitch, length, and/or tone of a sound that a human may distinguish using an auditory organ.

According to psychoacoustics theory, a user may perceive a magnitude signal of a higher band, for example, a bandwidth of 8 to 16 kHz with low resolution. Therefore, a magnitude signal corresponding to a higher band voice signal may be divided into magnitude signals of a plurality of bandwidth sections through division based on a bark scale unit. The plurality of bandwidth sections may include, for example, 8000 to 9600 Hz, 9600 to 12000 Hz, and 12000 to 15600 Hz based on a bark scale and a magnitude signal corresponding to a higher band voice signal may be divided into magnitude signals of the respective bandwidth sections.

In operation 430, the computer system 100 may calculate average energy for each of the magnitude signals divided in operation 420. The computer system 100 may calculate average energy, that is, average frequency energy in a bandwidth section to which each magnitude signal corresponds, for each of the divided magnitude signals.

In operation 440, the computer system 100 may input, to the second network, the average energy calculated in operation 430 and may acquire a second mask to be applied to the second magnitude signal as the output of the second network.

The average energy calculated in operation 430 may be an input parameter for performing inference in the second network. A magnitude signal in which noise is cancelled, that is, the second magnitude signal in which noise is cancelled may be acquired by applying (e.g., multiplying) the second mask output by the second network to the second magnitude signal.

The second mask may be an IRM for the average energy calculated in operation 430. As described above, the second mask may be applied to the second magnitude signal through multiplication with the second magnitude signal.

According to some example embodiments, as in operation 410, a lower band magnitude signal may be input to the second network. That is, the lower band magnitude signal may be an input parameter for the second network and a noise cancellation operation may be performed through inference by the second network.

Here, as in operations 420 to 440, average energy of each of the magnitude signals divided into a plurality of bandwidth sections may be calculated for a higher band magnitude signal and the calculated average energy may be used as an input parameter for the second network. In this manner, a computational amount in the second network for a higher band magnitude signal may decrease.

Figure 5:
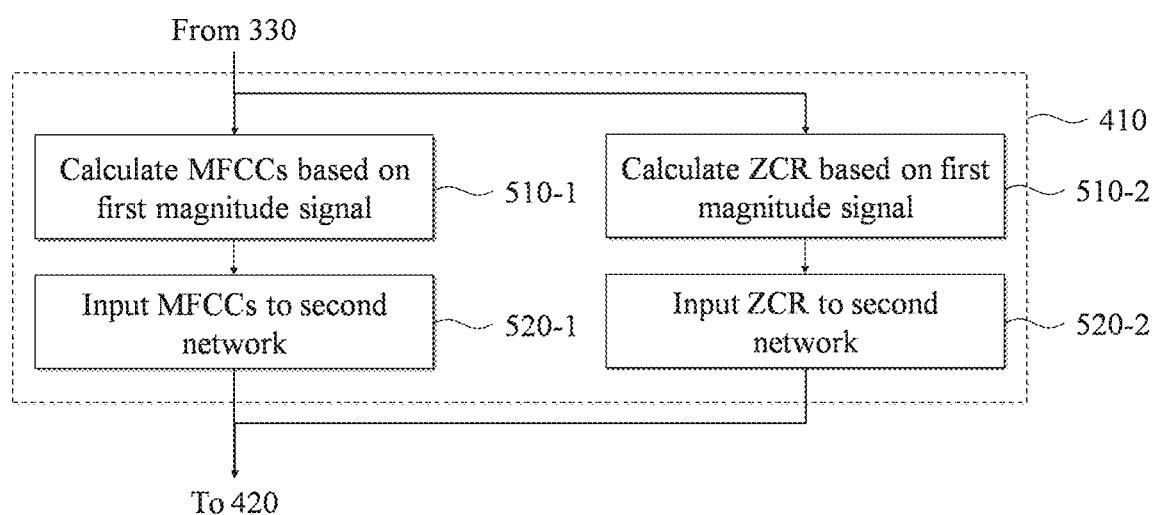
FIG. 5 is a flowchart illustrating an example of a method of determining an input parameter for a machine learning model in generating a mask to be applied to a first magnitude signal of a first frequency band among magnitude signals using a machine learning model according to some example embodiments.

FIG. 5 is a flowchart illustrating an example of a method of determining an input parameter for a machine learning model in generating a mask to be applied to a first magnitude signal of a first frequency band among magnitude signals using a machine learning model according to some example embodiments.

A method of determining a parameter input to a second network based on a first magnitude signal of a first frequency band corresponding to a lower band among magnitude signals is described with reference to operations 510-1 to 520-2 of FIG. 5.

Referring to FIG. 5, in operation 510-1, the computer system 100 may calculate a predetermined (or, alternatively, desired) number of MFCCs based on the first magnitude signal of the first frequency band.

In operation 520-1, the computer system 100 may input the calculated MFCCs to a machine learning model, for example, the frequency NS net 150, to acquire the first mask to be applied to the first magnitude signal.

That is, MFCCs for the first magnitude signal as well as the first magnitude signal may be input parameters for performing inference in the second network. A predetermined (or, alternative desired) number of, for example, 20 coefficients for the first magnitude signal may be calculated and input to the second network. Such MFCCs may provide information about a shape of the entire frequency of the first magnitude signal.

The MFCC may be a coefficient used to feature-vectorize a voice signal. For example, the MFCC may be a feature of the first magnitude signal.

The MFCC may be calculated, for example, extracted from the first magnitude signal based on a Mel-scale considering a characteristic of the cochlea that relatively excellently recognizes a voice signal of a lower frequency band and does not excellently recognize a voice signal of a higher frequency band. The MFCC may be calculated for each section by dividing the first magnitude signal into a plurality of sections based on Mel-scale.

In operation 510-2, the computer system 100 may calculate a zero-crossing rate (ZCR) based on the first magnitude signal of the first frequency band.

In operation 520-2, the computer system 100 may input the calculated ZCR to the second network to acquire the first mask to be applied to the first magnitude signal.

That is, the ZCR for the first magnitude signal as well as the first magnitude signal may be an input parameter for performing inference in the second network. The ZCR may be calculated by analyzing the first magnitude signal on a time axis. The ZCR may provide information about noise included in a time axis component of the first magnitude signal. The ZCR may represent a sign change rate according to a (voice) signal, that is, a rate at which a signal changes from positive to zero to negative or from negative to zero to positive. That is, the ZCR may represent a rate at which a sign of a signal changes.

The computer system 100 may input the first magnitude signal, MFCCs for the first magnitude signal, and/or the ZCR for the first magnitude signal to the second network, and may acquire the first mask to be applied to the first magnitude signal as the output of the second network.

Figure 6:
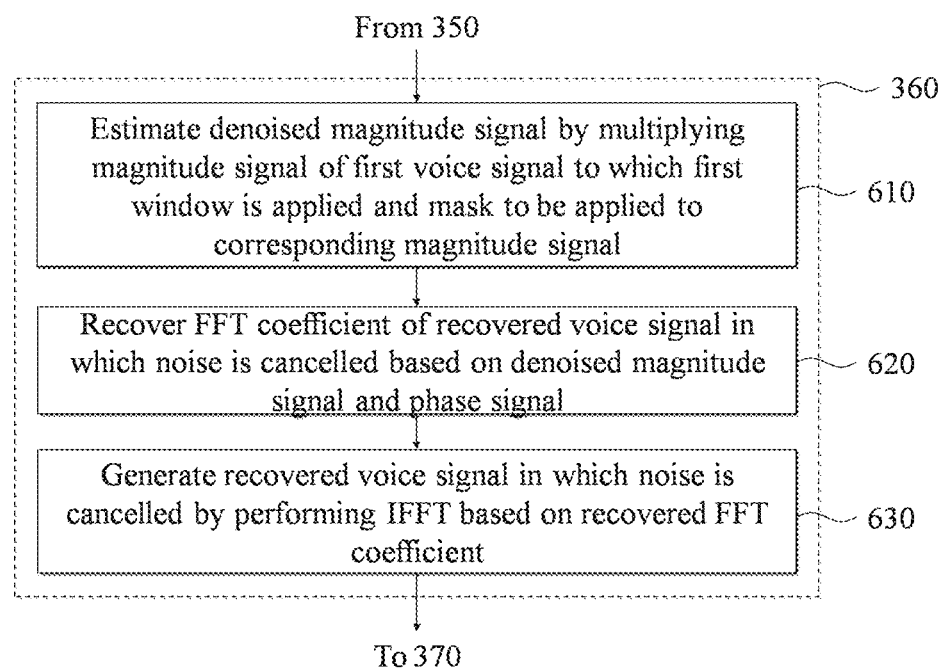
FIG. 6 is a flowchart illustrating an example of a method of recovering a voice signal in which noise is cancelled using a mask from a machine learning model and an input voice signal according to some example embodiments.

FIG. 6 is a flowchart illustrating an example of a method of recovering a voice signal in which noise is cancelled using a mask from a machine learning model and an input voice signal according to some example embodiments.

A method of recovering a voice signal in which noise is cancelled is described with reference to operations 610 to 630 of FIG. 6.

Referring to FIG. 6, in operation 610, the computer system 100 may multiply the magnitude signal of the first voice signal to which the first window is applied and the mask to be applied to the corresponding magnitude signal, and may estimate a denoised magnitude signal, that is, a magnitude signal in which noise is cancelled. For example, as described above, the computer system 100 may estimate, as the magnitude signal in which noise is cancelled, the magnitude signal acquired by multiplying the first magnitude signal and the first mask acquired in operation 410 and by multiplying the second magnitude signal and the second mask acquired in operation 440. The computer system 100 may estimate the first magnitude signal in which noise is cancelled by multiplying the first magnitude signal and the first mask and may estimate the second magnitude signal in which noise is cancelled by multiplying the second magnitude signal and the second mask.

In operation 620, the computer system 100 may recover an FFT coefficient of a recovered voice signal in which noise is cancelled based on the denoised magnitude signal and the phase signal acquired in operation 330. That is, the computer system 100 may recover the FFT coefficient of the recovered voice signal in which noise is cancelled based on the magnitude signal in which noise is cancelled through operation 610 for the first voice signal to which the first window is applied, and the phase signal in which noise is cancelled through operation 330, that is, the phase signal in which noise is cancelled by the first network in operation 310.

In operation 630, the computer system 100 may generate the recovered voice signal in which noise is cancelled by performing the IFFT based on the recovered FFT coefficient. The recovered voice signal generated in operation 630 may be a second voice signal before the second window is applied compared to the recovered voice signal 180 and may be the recovered voice signal 180 as the second window is applied through operation 370.

The recovered voice signal 180 may be output from the computer system 100, for example, through the speaker 240.

FIG. 7 is an example of a mask estimated by a machine learning model according to some example embodiments.

Each of (a) to (d) of FIG. 7 may represent an example of a mask (IRM or a complex ideal ratio mask (CIRM)) estimated through inference by a second network. That is, each of (a) to (d) may represent an optimal and/or output value estimated by the second network.

By multiplying a mask by a magnitude signal of a first voice signal to which a first window is applied, noise included in the first voice signal to which the first window is applied may be suppressed.

In (a) to (d), for example, the x axis may represent a frequency ((a) and (b)) or a time ((c) and (d)) and the y axis may represent a value multiplied by the first voice signal to which the first window is applied.

A shape and a magnitude of a value of a mask estimated by the second network may differ from the example of FIG. 7 based on the aforementioned input parameter for the second network and a result of estimation by the second network.

Figure 8:
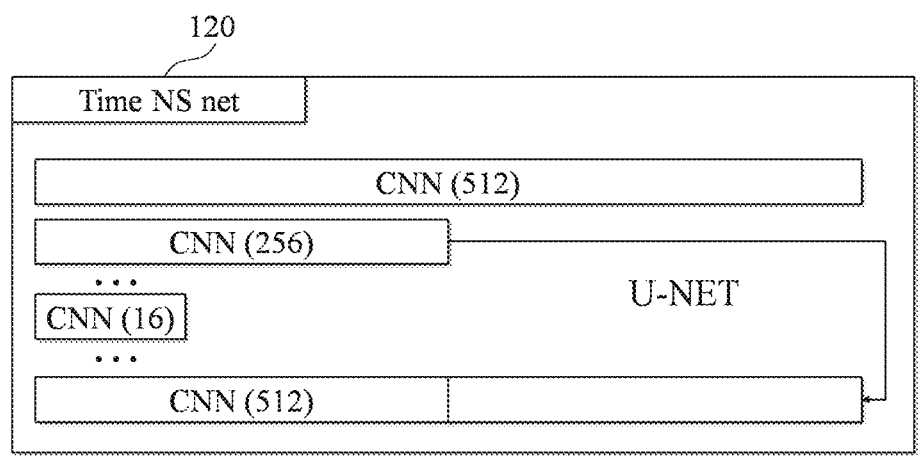
FIG. 8 illustrates an example of a first network according to some example embodiments.
Figure 9:
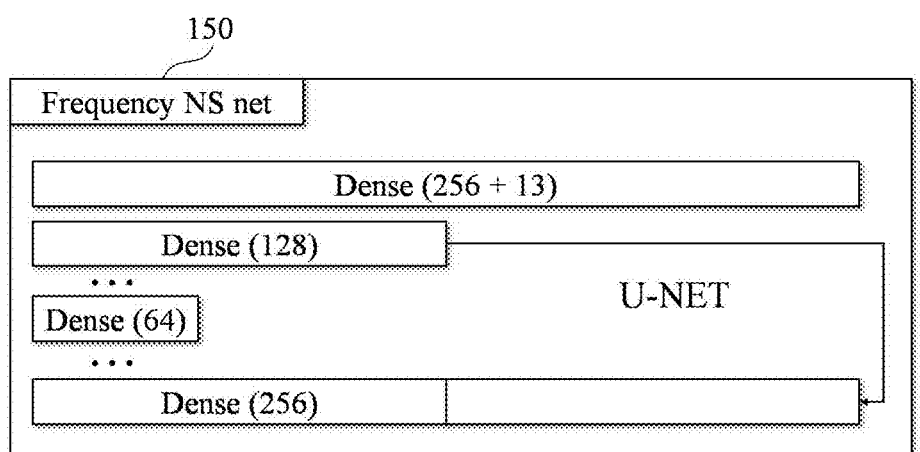
FIG. 9 illustrates an example of a second network according to some example embodiments.

FIG. 8 illustrates an example of a first network according to some example embodiments; and FIG. 9 illustrates an example of a second network according to some example embodiments. As described above, each of the first network and the second network may be a machine learning model in a u-net structure. The u-net structure has a characteristic such that a size of each layer may be configured to be a half of a previous layer, such as 512-256-128 64 32 16 16 32 64 128-256-512, such layers may have a shape of "U". Although FIG. 8 illustrates an example in which the time NS net 120 of FIG. 1 is implemented using a total of 12 layers of a CNN, FIG. 9 illustrates an example in which the frequency NS net 150 of FIG. 1 is implemented using a total of 6 layers of a dense network. However, this is provided as only an example of configuring the first network and the second network.

Conventional devices for cancelling noise in a voice signal perform noise cancellation in a frequency domain or a time domain. However, noise cancellation in the frequency domain fails to adequately cancel the noise component corresponding to a phase of the voice signal, and noise cancellation in the time domain fails to adequately cancel high frequency noise in the voice signal. Accordingly, the conventional devices are unable to cancel a sufficient amount of the noise from a voice signal.

However, according to some example embodiments, improved devices and methods are provided for cancelling noise in a voice signal. For example, the improved devices and methods perform noise cancellation in the time domain before performing noise cancellation in the frequency domain. Accordingly, the improved devices and methods adequately cancel the noise component corresponding to the phase of the voice signal and high frequency noise in the voice signal. Thus, the improved devices and methods overcome the deficiencies of the conventional devices to increase the amount of noise cancelled from the voice signal.

According to some example embodiments, operations described herein as being performed by the computer system 100, the communicator 210 and/or the processor 220 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In some example embodiments, the processing circuitry may perform some operations (e.g., the operations described herein as being performed by the time NS net 120, the frequency NS net 150 and/or the machine learning model) by artificial intelligence and/or machine learning. As an example, the processing circuitry may implement an artificial neural network (e.g., the time NS net 120, the frequency NS net 150 and/or the machine learning model) that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

The systems and/or the apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to some example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of a program instruction may include a machine language code produced by a compiler and a high-language code executable by a computer using an interpreter.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A noise cancellation method using a computer system, the noise cancellation method comprising:
    generating a first voice signal by canceling a first portion of noise included in an input voice signal using a first network, the first network being a trained u-net structure, and the first portion of the noise being in a time domain;
    applying a first window to the first voice signal to obtain a first windowed voice signal;
    performing a fast Fourier transform (FFT) on the first windowed voice signal to acquire a magnitude signal and a phase signal;
    acquiring a mask using a second network based on the magnitude signal, the second network being another trained u-net structure;
    applying the mask to the magnitude signal to obtain a masked magnitude signal;
    generating a second voice signal by canceling a second portion of the noise by performing an inverse fast Fourier transform (IFFT) on the first windowed voice signal based on the masked magnitude signal and the phase signal; and
    applying a second window to the second voice signal to obtain a second windowed voice signal.

2. The noise cancellation method of claim 1, wherein at least one of the first window or the second window comprises a Kaiser-Bessel-derived window for time domain aliasing cancellation (TDAC) in modified discrete cosine transform (MDCT).

3. The noise cancellation method of claim 1, wherein
    the magnitude signal includes a first magnitude signal and a second magnitude signal; and
    the acquiring the mask comprises:
        acquiring a first mask using the second network based on the first magnitude signal, the first magnitude signal being in a first frequency band,
        dividing the second magnitude signal into a plurality of second magnitude sub-signals according to bandwidth, the second magnitude signal being in a second frequency band greater than the first frequency band,
        calculating an average energy for each of the plurality of second magnitude sub-signals, and acquiring a second mask using the second network based on the average energy for each of the plurality of second magnitude sub-signals.

4. The noise cancellation method of claim 3, wherein the dividing divides the second magnitude signal into the plurality of second magnitude sub-signals by dividing the second frequency band based on a bark scale unit.

5. The noise cancellation method of claim 3, wherein
the first mask is an ideal ratio mask (IRM) for the first magnitude signal and the second mask is an IRM for the average energy; and
the applying the mask to the magnitude signal comprises multiplying the first mask by the first magnitude signal and multiplying the second mask by the second magnitude signal.

6. The noise cancellation method of claim 3, wherein the acquiring the first mask comprises:
calculating a number of Mel-frequency cepstral coefficients (MFCCs) based on the first magnitude signal; and
acquiring the first mask using the second network based on the MFCCs.

7. The noise cancellation method of claim 3, wherein the acquiring the first mask comprises:
calculating a zero-crossing rate (ZCR) based on the first magnitude signal; and
acquiring the first mask using the second network based on the ZCR.

8. The noise cancellation method of claim 1, wherein the generating the second voice signal comprises:
estimating a denoised magnitude signal by multiplying the magnitude signal and the mask;
recovering an FFT coefficient based on the denoised magnitude signal and the phase signal; and
recovering the second voice signal by performing the IFFT based on the FFT coefficient.

9. The noise cancellation method of claim 1, wherein the input voice signal comprises a plurality of frames.

10. A non-transitory computer-readable storage medium storing instructions that, when executed by at least one processor, cause a computer system including the at least one processor to perform the noise cancellation method of claim 1.

11. A computer system for cancelling noise, the computer system comprising:
a memory storing computer-readable instructions; and
at least one processor configured to execute the computer-readable instructions to cause the computer systems to,
generate a first voice signal by canceling a first portion of noise included in an input voice signal using a first network, the first network being a trained u-net structure, and the first portion of the noise being in a time domain,
apply a first window to the first voice signal to obtain a first windowed voice signal,
perform a fast Fourier transform (FFT) on the first windowed voice signal to acquire a magnitude signal and a phase signal,
acquire a mask using a second network based on the magnitude signal, the second network being another trained u-net structure,
apply the mask to the magnitude signal to obtain a masked magnitude signal,
generate a second voice signal by canceling a second portion of the noise by performing an inverse fast Fourier transform (IFFT) on the first windowed voice signal based on the masked magnitude signal and the phase signal, and
apply a second window to the second voice signal to obtain a second windowed voice signal.

12. The computer system of claim 11, wherein at least one of the first window or the second window comprises a Kaiser-Bessel-derived window for time domain aliasing cancellation (TDAC) in modified discrete cosine transform (MDCT).

13. The computer system of claim 11, wherein
the magnitude signal includes a first magnitude signal and a second magnitude signal; and
the at least one processor is configured to cause the computer system to,
acquire a first mask using the second network based on the first magnitude signal, the first magnitude signal being in a first frequency band,
divide the second magnitude signal into a plurality of second magnitude sub-signals according to bandwidth, the second magnitude signal being in a second frequency band greater than the first frequency band,
calculate an average energy for each of the plurality of second magnitude sub-signals, and
acquire a second mask using the second network based on the average energy for each of the plurality of second magnitude sub-signals.

14. The computer system of claim 11, wherein the at least one processor is configured to cause the computer system to:
estimate a denoised magnitude signal by multiplying the magnitude signal and the mask;
recover an FFT coefficient based on the denoised magnitude signal and the phase signal; and
recover the second voice signal by performing the IFFT based on the FFT coefficient.

15. The computer system of claim 13, wherein the at least one processor is configured to cause the computer system to divide the second magnitude signal into the plurality of second magnitude sub-signals by dividing the second frequency band based on a bark scale unit.

16. The computer system of claim 13, wherein the at least one processor is configured to cause the computer system to apply the mask to the magnitude signal by multiplying the first mask by the first magnitude signal and multiplying the second mask by the second magnitude signal.

17. The noise cancellation method of claim 1, further comprising:
generating an audio signal based on the second windowed voice signal; and
driving a speaker to output the audio signal.

18. The noise cancellation method of claim 1, wherein the second portion of the noise is in a frequency domain.

19. The computer system of claim 11, wherein the at least one processor is configured to cause the computer system to:
generate an audio signal based on the second windowed voice signal; and
drive a speaker to output the audio signal.

20. The computer system of claim 11, wherein the second portion of the noise is in a frequency domain.

* * * * *